S. E. Davis,
Twine Holder,
No. 18,391. Patented Oct. 13, 1857.

UNITED STATES PATENT OFFICE.

S. E. DAVIS, OF WATERBURY, CONNECTICUT.

TWINE-REEL.

Specification of Letters Patent No. 18,391, dated October 13, 1857.

*To all whom it may concern:*

Be it known that I, S. E. DAVIS, of Waterbury, in the county of New Haven and State of Connecticut, have invented a new and useful Improvement in Twine-Reels; and I do hereby declare that the following is a full, clear, and exact description of the same, reference being had to the annexed drawings, making a part of this specification, in which—

Figure 1:
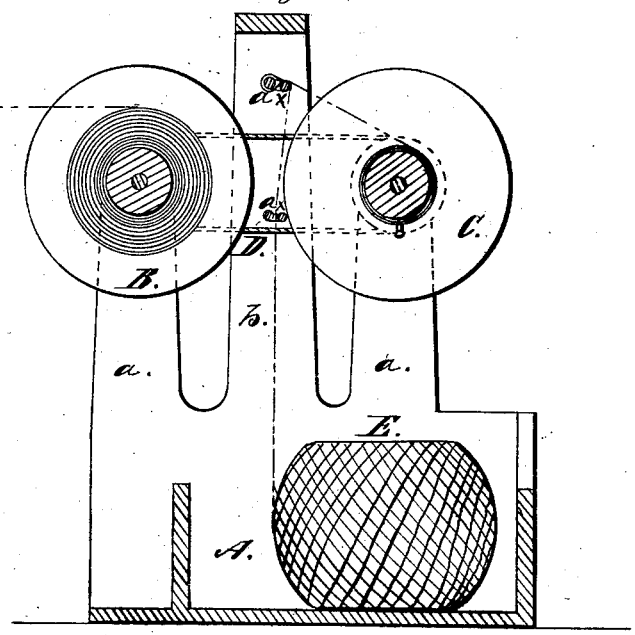
Figure 2:
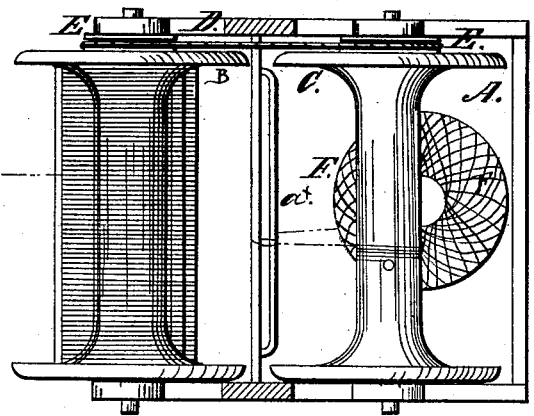

Figure 1 is a vertical central section of my improvement. Fig. 2, is a plan or top view of ditto.

Similar letters of reference indicate corresponding parts in the two figures.

This invention relates to a useful improvement in reels such as is used by store-keepers and others, for holding twine, and from which the twine is unwound as it is used.

The object of the invention is to render the reel self-winding, and thereby save time which has hitherto been necessarily expended in replenishing it.

The invention consists in the employment or use of two reels connected by a cord or band so that both reels will be rotated whenever the twine is unwound from one, one reel being filled at first with twine and the other having the end of a ball of twine attached to it, said ball being placed in a suitable box beneath the reels. As the twine is used and unwound from the filled reel, motion will be given to the empty one on account of the connection hitherto alluded to, and when the reel that was first filled is empty or has all the twine unwound from it, the other one will be filled. By this means one reel is filled as the other is emptied, so that all that is required to have a full reel at all times is to attach the end of a ball of twine to either reel as it becomes empty.

To enable those skilled in the art to fully understand and construct my invention, I will proceed to describe it.

A, represents a box having three standards $(a)$, $(a)$, $(b)$, at each side.

B, C, are two reels or spools, the journals of which are fitted in the upper ends of the standards $(a)$, $(a)$, and the two spools are connected at one end by a belt or cord D which passes around pulleys E, E, attached to or formed on the ends of the spools. The spool B, is shown filled with twine; but the spool C is empty, and has the end of a ball of twine F, attached to it, said ball being within the box A, and the twine passing through guides $(a^x)$.

From the above description of parts, it will be seen that as the twine is used from the spool B, and said spool rotated, the spool C will be also rotated in consequence of the cord D, and the ball F will be wound upon said spool C, and when the twine on the spool B is exhausted or completely unwound from it, the ball F will be wound upon the spool C. A fresh ball of twine is then placed in the box A, and its end attached to spool B, which when the spool C is unwound will be again filled. Thus it will be seen that the device by the most simple means is rendered self-winding.

This device may be made portable so that it may be readily moved from place to place on a counter or table, or it may be permanently attached to any fixture if desired.

Having thus described my invention, what I claim as new, and desire to secure by Letters-Patent, is:

The combination of the two spools B, C, connected by the cord or belt D, and the box or receptacle A, arranged substantially as and for the purpose set forth.

S. E. DAVIS.

Witnesses:
NELSON J. WELTON,
FRANKLIN L. WELTON.